United States Patent [19]

Najer et al.

[11] 3,855,230

[45] Dec. 17, 1974

[54] 2-(3'-TRIFLUOROMETHYLTHIO-ANILINO)-BENZOIC ACID AND SALTS THEREOF WITH PHARMACEUTICALLY ACCEPTABLE BASES

[75] Inventors: Henry Najer; Jean-François Giudicelli, both of Paris, France

[73] Assignee: Synthelabo, Paris, France

[22] Filed: July 17, 1972

[21] Appl. No.: 272,141

[30] Foreign Application Priority Data
July 15, 1971 France .............................. 71.25856

[52] U.S. Cl. ... 260/294.8 G, 260/295 S, 260/297.5, 260/516, 424/263, 424/310
[51] Int. Cl............................................. C07d 31/34

[58] Field of Search.......... 260/297.5, 294.8 G, 516, 260/295 S

[56] References Cited
UNITED STATES PATENTS
3,627,774   12/1971   Sarbach et al................... 260/297.5
3,726,879   4/1973   Jucker et al. ................. 260/295.5 R

*Primary Examiner*—Alan L. Rotman
*Attorney, Agent, or Firm*—Armstrong, Nikaido & Wegner

[57] ABSTRACT

2-(3'-Trifluoromethylthio-anilino)benzoic acid and its salts are useful as anti-inflammatory and analgesic agents.

2 Claims, No Drawings

2-(3'-TRIFLUOROMETHYLTHIO-ANILINO)-BENZOIC ACID AND SALTS THEREOF WITH PHARMACEUTICALLY ACCEPTABLE BASES

The present invention provides the new compound 2-(3'-trifluoromethylthio-anilino)-benzoic acid, of the formula:

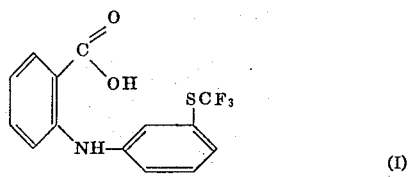

and its salts with pharmaceutically acceptable inorganic or organic bases, for example pyridoxine.

The invention also provides a process for the preparation of the compound of formula (I), in which a benzoic acid derivative of the formula:

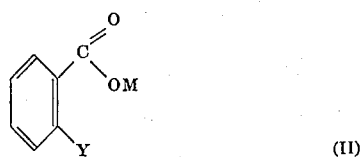

is condensed with a compound of the formula:

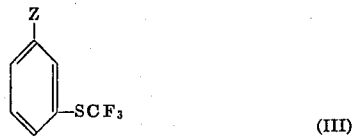

In the general formulae (II) and (III), M denotes a hydrogen atom or an atom of a monovalent metal (preferably an alkali metal) and Y and Z represent either a $-NH_2$ radical or a halogen atom (preferably an atom of chlorine or of bromine), with Z denoting a $-NH_2$ radical if Y denotes a halogen, and denoting a halogen if Y denotes a $-NH_2$ radical.

The reaction is preferably carried out in the presence of a catalyst containing copper and an acceptor for the hydrogen halide acid formed. This condensation takes place satisfactorily if the starting materials are reacted in equimolecular amounts and in an appropriate solvent. The latter can be dimethylformamide, the dimethyl ether of ethylene glycol, dimethyl sulphoxide, nitrobenzene or an aliphatic alcohol such as butanol. The reaction takes place at a temperature which is preferably between 100° and 200° C.

The catalysts containing copper which can be employed in the process of the invention are:

Either the various forms of divided metallic copper obtained mechanically or by chemical precipitation, such as, for example, copper powder or copper sponge, or various copper salts such as cuprous bromide or chloride, cupric, acetate, carbonate, oxide and sulphate, and the like, the preferred catalysts being cupric bromide and acetate.

The proportion of the acceptor for the hydrogen halide acid formed during the reaction can vary within wide limits. In general it must be sufficient to capture all the hydrogen halide acid formed during the reaction. If the reaction is carried out using the benzoic acid derivatives (II) as free acid, alkali metal carbonates, preferably potassium carbonate, and cuprous carbonate or cupric carbonate are above all employed. If an alkali metal salt of the derivative (II) of benzoic acid is employed, the acceptor of the hydrogen halide acid is preferably chosen from amongst the following substances: calcium hydride, alkali metal carbonates and tertiary organic amines such as N-ethylmorpholine. It is also possible to employ twice the equimolecular amount of the amine (III) chosen for carrying out the reaction; half participates in the condensation and the other half serves as an acceptor for the hydrogen halide acid.

Preferably, the derivatives (II) of benzoic acid are employed in the form of their previously formed potassium salts.

It is also possible to prepare these potassium salts in a very finely divided state by adding potassium carbonate to a boiling solution of the derivative (II) of benzoic acid in the solvent which is used for the reaction. In this latter case it is frequently advantageous to remove the greater part of the water formed by the neutralisation by distilling a certain proportion of the solvent before adding the catalyst and the compound (III).

The invention also comprises a process for the preparation of the salts which the compound (I) forms with inorganic or organic bases, by any known processes for the preparation of such salts.

Finally, the invention comprises the industrial applications of the compound (I) and of its salts, and more precisely their uses as medicines.

In fact, the compound (I) possesses anti-inflammatory and analgesic properties which render it valuable in therapy.

The anti-inflammatory properties of the compound (I) are especially demonstrated by means of the test involving the carraghenine-provoked oedema of the paw of rats (C.A. Winter, Non-steroidal anti-inflammatory Drugs, International Congress Series 81, Excerpta Medica Foundation 1965, p. 190-202). The 50 per cent efficient dose, that is to say the dose which when administered orally reduces the volume of the carraghenine oedema by 50 per cent, is 13 mg/kg.

The analgesic properties of the compound according to the invention are shown, for example, by means of the Randall and Selitto test (Arch. int. Pharm., 1957, 111, p. 409–418). In this test, the compound of the invention, when ingested at a dose of 27 mg/kg, produces a 114 per cent increase in the pain threshhold whilst flufenamic acid (the reference compound), administered orally at the same dose, only raises the threshhold by 61 per cent (the measurements being carried out 3 hours after ingestion).

Further, the toxicity of the compound (I) is low (LD 50 administered orally to Swiss mice: 530 (95 per cent confidence limits: 400 – 702)mg/kg), so that its therapeutic index is very favourable.

Compound (I) and its salts are used in the treatment of various inflammatory and rheumatological syndromes.

The invention consequently comprises all pharmaceutical compositions containing the compound (I) and its salts as active principles, combined with any appropriate excipients for its oral or rectal administration. These pharmaceutical compositions can also contain other medicinal substances with which the compound (I) and its salts are pharmaceutically and therapeutically compatible.

For oral administration, all the pharmaceutical forms appropriate for this type of administration are employed, that is to say tablets, gelatine-coated pills, cachets and the like, and the unit dose of the compound (I) or of its salts can vary from between 100 mg and 500 mg, the daily dose being between 100 mg and 2000 mg.

For rectal administration, suppositories containing 100 to 500 mg of the compound (I) or of its salts are used and are administered to patients at the rate of one to three per 24 hours.

The examples which follow illustrate the present invention without being limiting in character.

EXAMPLE 1

2-(3'-Trifluoromethylthio-anilino)-benzoic acid 12.9 g (0.054 mol/g) of potassium 2-bromobenzoate, 25 ml of bis-(2-methoxyethyl)-ether, 5.8 g (0.05 mol/g) of N-ethylmorpholine, 9.7 g (0.05 mol/g) of m-trifluoromethylthioaniline and 0.5 g of cupric acetate are introduced into a 150 ml three-neck flask equipped with a mechanical stirrer, a dip thermometer and a reflux condenser surmounted by a calcium chloride guard tube. This mixture is gradually heated to 140°–145° C whilst stirring, and this temperature is maintained for 1 hour 30 minutes. 4 ml of concentrated hydrochloric acid followed by 30 ml of water are successively added to the hot solution obtained and the mixture is thereafter successively extracted with 200 ml and then with twice 100 ml of chloroform. The chloroform extracts are combined and washed four times with 100 ml of water, the organic phase is dried over anhydrous sodium sulphate and filtered, the solvent is driven from the filtrate on a water bath, in vacuo, and the oily residue which remains is triturated twice in succession in 200 ml of water, decanting the water each time. The fatty solid compound is dried in vacuo over phosphorus pentoxide and is recrystallised twice in succession from cyclohexane. 5.5 g (yield × 35 percent) of 2-(3'-trifluoromethylthio anilino) — benzoic acid are thus obtained in the form of a slightly yellow crystalline compound which is insoluble in water and melts at 114°–116° C.

| Analysis $C_{14}H_{10}F_3NO_2S$ (313): | | | | |
|---|---|---|---|---|
| Calculated %: | C 53.67 | H 3.19 | N 4.47 | F 18.21 |
| Found %: | 54.02 | 3.10 | 4.39 | 17.93 |
| | 54.08 | 3.13 | 4.32 | 18.27 |

EXAMPLE 2

Pyridoxine 2-(3'-trifluoromethylthio-anilino)-benzpate 15.65 g (0.05 mol/g) of 2-(3'-trifluoromethylthioanilino)-benzoic acid are dissolved in 90 ml of hot water containing 2 g (0.05 mol/g of sodium hydroxide. 10.30 g (0.05 mol/g) of pyridoxine hydrochloride dissolved in 70 ml of water are added to this solution. The pyridoxine 2-(3'-trifluoromethylthio-anilino)-benzoate precipitates in the crystalline form. The crystals are filtered off, washed with distilled water, dried in vacuo and recrystallised from ethyl alcohol. 3.81 g (yield = 79 percent) of pyridoxine 2-(3'-trifluoromethylthio-anilino)-benzoate are obtained in the form of pale yellow crystals.

We claim:

1. 2-(3'-trifluoromethylthio-anilino)-benzoic acid and salts which it forms with pharmaceutically acceptable bases.

2. Pyridoxine 2-(3'-trifluoromethylthio-anilino) benzoate.

\* \* \* \* \*